US 9,669,457 B2

(12) United States Patent
Bigot et al.

(10) Patent No.: US 9,669,457 B2
(45) Date of Patent: Jun. 6, 2017

(54) RIVET FOR BLIND FASTENERS, ASSOCIATED SETTING TOOL AND METHOD FOR SETTING SUCH A RIVET (71) Applicant: LISI AEROSPACE, Paris (FR)

(72) Inventors: Frederic Bigot, Rueilly (FR); Jerome Couderc, Lafouillade (FR); Olivier Gay, Commeny (FR); Guy Pailhories, Villefranche de Rouergue (FR)

(73) Assignee: LISI Aerospace, Paris (FR)

( * ) Notice: Subject to any disclaimer, the term of this patent is extended or adjusted under 35 U.S.C. 154(b) by 0 days.

(21) Appl. No.: 14/596,810

(22) Filed: Jan. 14, 2015

(65) Prior Publication Data
US 2015/0196951 A1    Jul. 16, 2015

(30) Foreign Application Priority Data

Jan. 14, 2014   (FR) ...................... 14 50281

(51) Int. Cl.
| B21J 15/26 | (2006.01) |
| B21J 15/04 | (2006.01) |
| B21J 15/12 | (2006.01) |
| B25B 27/00 | (2006.01) |
| F16B 19/10 | (2006.01) |

(Continued)

(52) U.S. Cl.
CPC ............. *B21J 15/26* (2013.01); *B21J 15/043* (2013.01); *B21J 15/12* (2013.01); *B21J 15/14* (2013.01); *B21J 15/365* (2013.01); *B25B 27/0007* (2013.01); *F16B 19/1054* (2013.01); *F16B 19/1072* (2013.01); *F16B 31/00* (2013.01);

(Continued)

(58) Field of Classification Search
CPC ......... B25B 13/00; B25B 13/16; B25B 13/32; B25B 13/48; B25B 15/00
See application file for complete search history.

(56) References Cited

U.S. PATENT DOCUMENTS

| 3,236,143 A | 2/1966 | Wing |
| 3,728,882 A | 4/1973 | Rigot et al. |

(Continued)

FOREIGN PATENT DOCUMENTS

| EP | 1635994 | 3/2006 |
| EP | 1882860 A1 | 1/2008 |

OTHER PUBLICATIONS

Fritzen, Claas, French Search Report, FR 1450281, Sep. 12, 2014, 7 pages, INPI.

*Primary Examiner* — Lee D Wilson
(74) *Attorney, Agent, or Firm* — Henricks, Slavin & Holmes LLP (57) ABSTRACT A rivet for blind fastening may include a screw with a handling element, a break groove, a head separated from the handling element by the break groove, and a threaded part. The rivet may also include a sleeve with a collar and a tubular shank having an internal thread intended to come into engagement with the threaded part of the screw. The handling element includes a first handling portion able to guide introduction of the rivet in a setting tool, and a second handling portion able to transmit a torque, the two handling portions being separated by a blocking portion able to limit an axial movement of the rivet in a setting tool. A setting nose may be used for installing such a rivet, and the rivet, setting nose and a setting method can be used in the assembly of aircraft structures.

16 Claims, 7 Drawing Sheets (51) Int. Cl.
   *B21J 15/14*      (2006.01)
   *B21J 15/36*      (2006.01)
   *F16B 31/00*      (2006.01)
(52) U.S. Cl.
   CPC .... *Y10T 29/49956* (2015.01); *Y10T 29/53752* (2015.01)

(56) References Cited

U.S. PATENT DOCUMENTS

| | | | | |
|---|---|---|---|---|
| 6,564,680 | B1* | 5/2003 | Rinner | B25G 1/066 81/177.5 |
| 8,919,230 | B1* | 12/2014 | Gao | B25B 23/0035 279/22 |
| 2009/0183607 | A1* | 7/2009 | Johnson | B25B 15/008 81/177.1 |
| 2011/0131776 | A1 | 6/2011 | Stoeger | |
| 2014/0202288 | A1* | 7/2014 | Chen | B25B 15/04 81/177.1 |
| 2015/0196951 | A1* | 7/2015 | Bigot | B21J 15/043 29/525.06 |

* cited by examiner

RIVET FOR BLIND FASTENERS, ASSOCIATED SETTING TOOL AND METHOD FOR SETTING SUCH A RIVET

The present invention concerns blind fasteners, i.e. fasteners installed through structures to be assembled from only one side of the assembly, normally known as the "accessible" side. These fasteners are used for example for assembling the structures of an aircraft.

In particular, the present invention concerns a rivet for a blind fastener, of the type comprising a screw with a handling element, a breaking groove designed to hold under a tensile stress and break under a torsional stress, a head separated from the handling element by the breaking groove, a smooth shank and a threaded part, and a sleeve comprising a collar able to receive the screw head, and a tubular shank comprising an internal thread intended to come into engagement with the threaded part of the screw. This type of rivet is known for example from documents EP 1 635 994 and U.S. Pat. No. 3,236,143. The invention also concerns a setting nose for installation of such rivets.

To increase the production rate of aircraft and reduce the assembly costs, manufacturers seek to automate the assembly process with robots equipped with a nose assembly. In contrast to a human operator who can grip a rivet of complex shape and introduce it without difficulty into a bore, a robot can only install a fastener correctly if, before introduction of the rivet into the structure, the axes of the setting nose and the rivet are strictly coaxial. Known rivets for blind fasteners and known setting noses do not allow such a coaxiality to be achieved. When the rivets are inserted in the setting nose, the ends of the rivets have a significant angular deviation from the axis of the setting nose. Therefore when the robot attempts to introduce the rivet into a borehole opposite which it is positioned, the end of the rivet hits against the structure and cannot be introduced into the borehole.

The aim of the invention is to resolve the drawbacks of the rivets of the prior art, and in particular to provide a blind rivet and a setting tool which allows a robust automation of installation.

For this, the rivet according to the invention is of the abovementioned type, such that the handling element of the screw comprises a first handling portion able to guide the introduction of the rivet in a setting tool, and a second handling portion able to transmit a torque, the two handling portions being separated by a blocking portion able to limit an axial movement of the rivet in a setting tool.

Such a rivet may be gripped and held firmly by a setting nose such that its axis is virtually coaxial with the axis of the setting nose.

The device according to the invention also preferably has at least one of the following characteristics:
- the blocking portion is cylindrical and is linked to each handling portion by a radiused portion,
- the sleeve comprises two welded elements,
- the sleeve comprises a zone for bulb formation with an elastic resistance less than the elastic resistance of the rest of the sleeve,
- the sleeve comprises at least one compression groove made on an outer portion of the tubular shank of the sleeve between the collar and the zone for formation of the bulb,
- the torque is transmitted by means of splines, polygonal faces or a cylindrical face,
- the first handling portion comprises a chamfer,
- the sleeve comprises an end portion opposite the collar, with outer diameter smaller than the outer diameter of the shank.

The invention also concerns a setting nose for installation of a blind rivet. The setting nose comprises a cylindrical body with a pierced front face, a tubular sheath arranged inside the body, a mouth piece arranged inside the sheath and defining an inner passage. The mouth piece comprises two receiver portions for the handling element of the rivet, with a form complementary to said handling portions, at least one of the receiver portions being able to transmit a torque. Said receiver portions are axially separated by a median portion comprising at least one element movable radially in the inner passage and able to limit an axial movement of the rivet. Such a setting nose allows the rivet to be held firmly, coaxial with the axis of the setting nose. It also allows application of a high traction force to the rivet and application of a rotational torque to the same rivet.

The setting nose according to the invention also preferably has at least one of the following characteristics:
- the torque is transmitted by means of grooves, polygonal faces or a roller cage,
- the median portion comprises at least one housing in which the radially movable element is housed,
- an elastic means radially compresses the movable element towards the inside of the mouth piece,
- the mouth piece is movable axially and in rotation inside the sheath.

The invention also concerns a method for installation of a blind rivet according to the invention using a setting nose according to the invention, comprising a first step of engagement of the setting nose with the handling element of the screw, a second step of axial traction on the handling element and formation of a bulb on the sleeve, a third step of screwing of the screw into the sleeve and breakage of the handling element of the screw at the level of the breaking groove. During the step of engagement of the setting nose with the handling element of the screw, a radially movable element limits an axial movement of the rivet in the setting nose.

According to another characteristic of the installation method according to the invention, during the steps of bulb formation, screwing of the screw and breakage of the handling element, the handling portions of the screw are contained in the receiver portions of the mouth piece, the blocking portion of the screw rests against the movable element, and the mouth piece is contained inside the sheath so as to prevent any radial movement of the movable element.

Further aims, characteristics and advantages of the invention will appear from the description of exemplary embodiments of the invention, which is given in conjunction with the drawings in which.

To facilitate understanding of the drawings, only the elements necessary for comprehension of the invention has been shown. The same elements carry the same references from one drawing to another.

Figure 1:
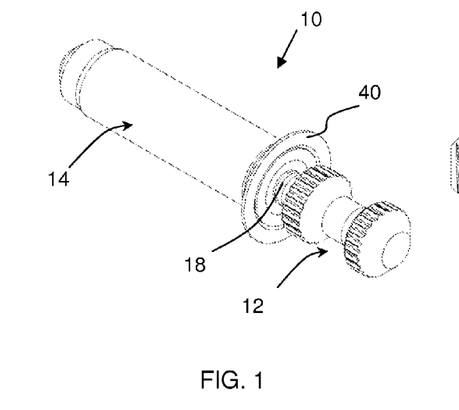
FIG. 1 is an isometric view of a rivet according to a first embodiment of the invention, in an uninstalled state.
Figure 2:
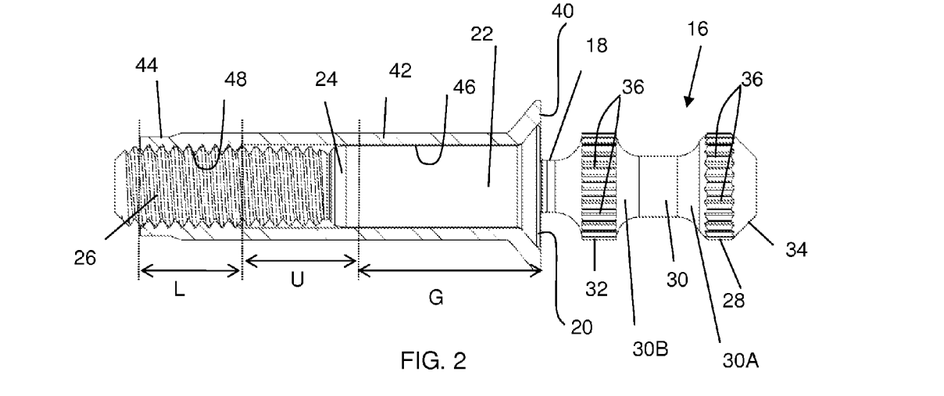
FIG. 2 is a cross-section view of a rivet according to a first embodiment of the invention, in an uninstalled state.
Figure 3:
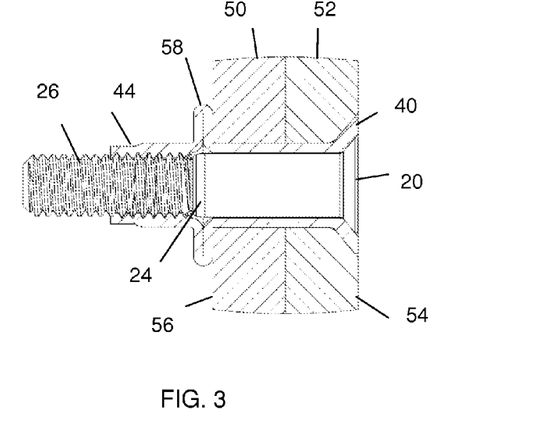
FIG. 3 is a cross-section view of a rivet according to a first embodiment of the invention, in an installed state.

With reference to FIGS. 1 to 3, a rivet 10 according to one embodiment of the invention comprises a screw 12 and a sleeve 14. The screw 12 comprises a handling element 16 intended to break on installation of the rivet, a breaking groove 18, a countersink head 20, a smooth cylindrical shank 22, a transition portion 24 and a threaded portion 26. The transition portion 24 allows the cylindrical shank 22 to be connected to the threaded portion 26, and has a maximum diameter smaller than the diameter of the cylindrical shank 22. The transition portion 24 is here depicted in curved form but may assume a conical form.

The handling element 16 comprises a first handling portion 28, a blocking portion 30 and a second handling portion 32. At its free end, the first handling portion 28 has a chamfer 34 which facilitates centering and introduction of the handling element 16 in a setting nose. In this example, each handling portion 28, 32 comprises torque transmission means in the form of twenty-four splines 36. These splines are arranged axially over a cylindrical part of the outer periphery of each handling portion 28, 32, distributed regularly and aligned axially to each other. The two handling portions 28, 32 have a function of centering the fastener in a setting nose and transmitting the torque between the setting nose and the fastener. The use of a large number of splines on the first portion 28 associated with the chamfer 34 helps automatic engagement.

The centering achieved by the double spline system allows adjustment of the axis of the rivet 10 with the axis of the setting nose, which is itself adjusted by the robot to the axis of the drilling in the structure to be assembled. Thus such a handling element 16 allows a robot to introduce the rivet 10 into a drilling without interference or damage on the structure. Without such an axial alignment, introduction of the rivet by a robot into a drilling of the structure to be assembled would be impossible.

The breaking groove 18 is dimensioned so that it has the smallest diameter of the screw 12 able to support a given traction stress on installation and break under a given torsional stress.

The blocking portion 30 comprises a smooth cylindrical median part and two concave radiused portions 30A and 30B, linked respectively to the handling portions 28, 32. The diameter of the smooth cylindrical part of the blocking portion 30 is smaller than the diameter of the handling portions 28, 32 but greater than the smallest diameter of the breaking groove 18. The blocking portion cross-section is therefore greater than the cross-section of the breaking groove. The radiused portions 30A, 30B ensure the stop of the handling element in a setting tool in the axial direction, blocking any axial movement of said rivet during installation.

The length of the smooth shank 22 is selected as a function of a thickness range of the structures to be assembled, varying between a minimum thickness and a maximum thickness.

The screw 12 is inserted with clearance in a sleeve 14 which comprises a widened collar 40 able to receive the countersink head 20 of the screw, and a tubular shank 42. Before installation of the rivet 10 in a structure, the outer surface of the tubular portion 42 is cylindrical and at its end opposite the collar 40 has a cylindrical portion 44 of reduced outer diameter, facilitating insertion of the rivet 10 in a bore. This thinner portion 44 is optional and the sleeve may have a constant outer diameter over the entire length of the tubular portion 42.

The tubular shank 42 has a smooth cylindrical inner surface 46 and a threaded inner surface 48 arranged at the end of the sleeve 14 opposite the collar 40. The threading of the screw 12 and the internal threading of the sleeve 14 are complementary. These are for example threads to standard AS8879, commonly used for aeronautical fasteners.

The total length the sleeve 14 is divided into three successive, adjacent zones performing separate functions. A first zone G, called the clamping zone, comprises the collar 40 and a portion of the tubular shank 42 with a smooth inner surface 46, corresponding to a minimum thickness of the structure to be assembled.

A second deformation zone U extends over the rest of the tubular shank 42 with a smooth inner surface 46. This zone U, when the rivet 10 is not installed, covers the remaining portion of the smooth shank 22 of the screw, the transition zone 24 and a threaded portion 26. The zone U of the sleeve is intended to be deformed, to form a bulb which will rest on the blind side of the structures to be assembled. To facilitate formation of the bulb, the zone U may be annealed in annular fashion, for example by means of an induction machine, or comprise a shoulder (not shown) over a portion of the smooth inner surface 46 of the sleeve, reducing the thickness of the sleeve over the length of this zone.

The third zone L of the sleeve extends over the entire threaded portion of the tubular shank 42. Its function is to prevent any translation movement between the sleeve and the end of the screw, and allow the screw to be screwed into the sleeve. When the rivet is not installed, this zone L is in contact with an end portion of the thread 26 of the screw 12.

FIG. 3 shows the rivet 10 of FIGS. 1 and 2 in the installed state in two structures 50, 52 to be assembled. The handling element 16 has been broken at the level of the breaking groove 18, so that only the head 20 of the screw and the collar 40 of the sleeve remain, together forming the head of the rivet and embedded in a countersinking previously made in an accessible face 54 of the structure 50. The first zone G of the sleeve 14 is fully embedded in the structures 50, 52. The second zone U of the sleeve is deformed and comprises a bulb 58, one face of which is in contact with the blind side 56 of the structure 52 opposite the accessible side 54. The tension set between the rivet head 20, 40 and the bulb 58 keeps the structures 50, 52 assembled. The third zone L of the sleeve, in the installed position, covers a portion of the thread 26 of the screw adjacent to the transition portion 24.

The screw is for example made of a titanium alloy Ti6Al4V coated with a layer of lubricant, and the sleeve is for example made of passivated steel A286. In the second annealed zone U, the strength is around 600 MPa, whereas the strength of the first and third zones G and L is around 1200 MPa.

Figure 4:
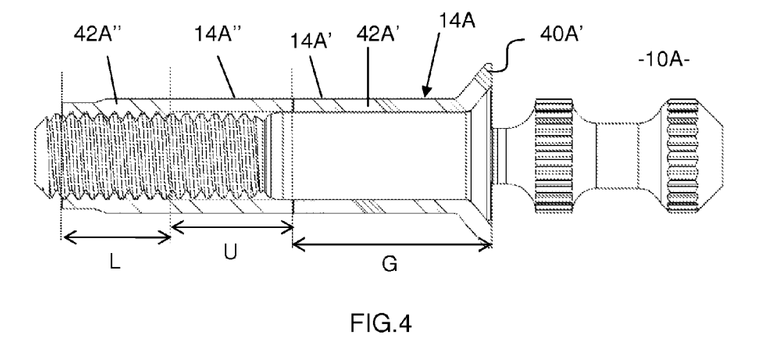
FIG. 4 is a view of a rivet according to a second embodiment of the invention, in an uninstalled state, comprising a sleeve formed from two welded sleeve elements.

FIG. 4 is a view of a rivet 10A according to a second embodiment of the invention. In FIG. 4, elements identical to those of FIGS. 1 to 3 retain the same references, different elements comprise the same reference to which the letter A has been added. The only difference between the rivet of FIG. 4 and the rivet of FIGS. 1 to 3 lies in the sleeve 14A, which in the second embodiment is formed from two elements 14A' and 14A" welded together.

The first sleeve element 14A' comprises an enlarged collar 40A' and a tubular portion 42A' of smooth inner surface, able to cover a smooth shank portion 22 of the screw, corresponding to the minimum thickness of the structure to be clamped. The total length of this first sleeve element 14A' has substantially the same length G as the first zone of the sleeve 14 of the rivet described in connection with FIGS. 1 to 3. The sleeve element 14A' is for example made of work-hardened and age-hardened steel A286, with a strength of 1200 MPa.

The second sleeve element 14A" comprises a tubular portion 42A" of sufficient length to cover the remaining smooth shank portion 22, the transition portion 24 and the majority of the thread 26 of the screw. This second element has a length equal to the sum of the lengths of the second and third zones U and L of the sleeve 14 of the rivet 10 described in connection with FIGS. 1 to 3. In the same way as described above, the second sleeve element 14A" is locally annealed or thinned over the second zone U, so as to have a lower strength allowing the formation of the bulb. The sleeve element 14A" is for example made of annealed stainless steel, with a strength of 600 MPa maximum. Other materials or treatments may be used.

The two sleeve elements 14A' and 14A" are welded, for example by means of welding by laser, electron beam or friction.

The advantage of using two sleeve elements is to facilitate production of the sleeve 14A, for example by reducing the inner lengths to be machined and the associated difficulties for obtaining tight tolerances, without significantly increasing the cost. A second advantage is to allow production on an industrial scale, and hence at low cost, of a large number of second elements 14A" of identical lengths, and to weld them to first elements 14A' of different lengths but the same diameter, thus adapting to different thicknesses of structures to be clamped.

Figure 5:
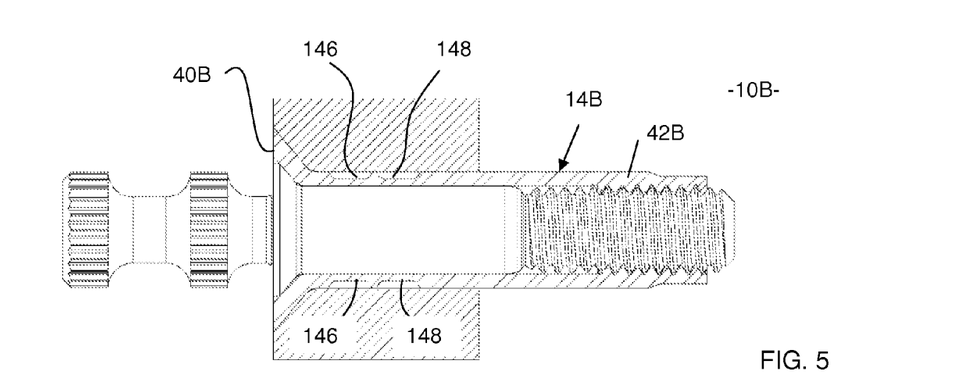
FIG. 5 is a view of a rivet according to a third embodiment of the invention, in an uninstalled state, comprising grooves made in an outer portion of the sleeve.

FIG. 5 is a view of the rivet 10B according to a third embodiment of the invention. In FIG. 5, elements identical to those of FIGS. 1 to 3 retain the same references, while different elements comprise the same reference to which the letter B has been added. The only difference between the rivet of FIG. 5 and the rivet of the previous figures is that the sleeve 14B comprises two annular grooves 146 and 148 made on the outer surface of the smooth tubular portion 42B of the sleeve 14B, arranged on the first zone G, between the widened collar 40B and the second zone U for bulb formation.

Because of their arrangement over a zone of the sleeve in contact with the inner wall of a bore of structure, the annular grooves 146 and 148 compress between the sleeve 14B and the structure when a traction force is applied to the screw to form a bulb. On compression, the grooves thus allow compensation for variations in form and dimension of the bulb due to the different thicknesses which may be clamped by a rivet 10B of a given length. In particular, the grooves allow consistent formation of a single bulb of satisfactory diameter systematically on contact with the blind face of the structures to be assembled, irrespective of the thickness to be clamped, over the entire clamping range of the fastener. The number of grooves, their shape and depth may vary over the length of the first zone G as a function of the length of the zone G, the thickness of the sleeve and its outer diameter.

Figure 6:
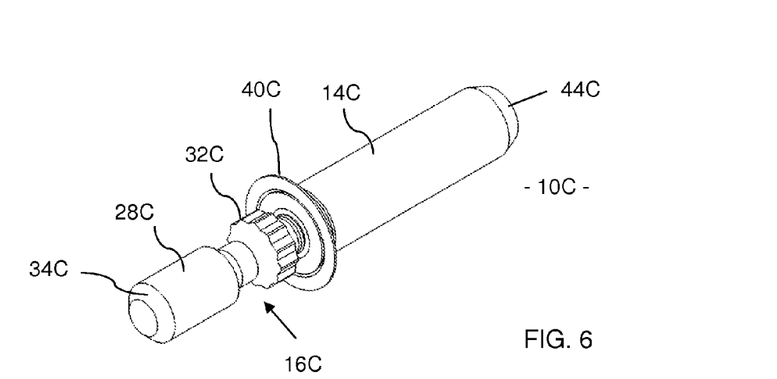
FIG. 6 is a view of a rivet according to a fourth embodiment of the invention, in an uninstalled state, comprising handling portions of different forms.
Figure 12:
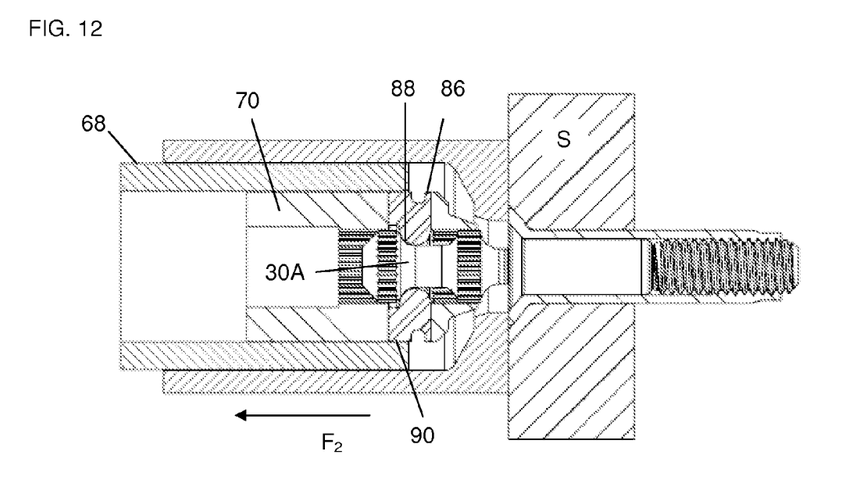

FIG. 6 is a view of a rivet 10C according to a fourth embodiment of the invention. In this embodiment, the first portion 28C of handling element 16C is a cylinder and comprises a chamfer 34C with the same function as the chamfer 34 of rivet 10. The second handling portion 32C comprises polygonal faces 36C distributed over its periphery. In this example, the first handling portion 28C has a function of centering and guiding the handling element in a setting tool, while the second handling portion 32C has a function of transmitting torque between the setting tool and the rivet 100. The diameter of the first handling portion 28C is here less than or equal to the maximum diameter of the second handling portion 32C. The length of the first handling portion 28C in the axial direction is greater than the length of the second handling portion 32C, in particular to reduce the angular deflection at the end of the rivet because of an increase in the contact surface between the setting tool and the second portion. This configuration shown in FIG. 12 allows alignment of the axes of the rivet and the setting nose with excellent precision of the order of one degree. The blocking portion 30C is identical to the blocking portion of the rivet 10 and performs the same function as a stop in translation of the rivet 10C in a setting tool. The sleeve 14C comprises, at the opposite end to the collar, a chamfer 44C which facilitates insertion of the rivet in a borehole and absorbs a slight angular clearance between the axis A of the rivet 100 and the axis of the setting nose.

Figure 7A:
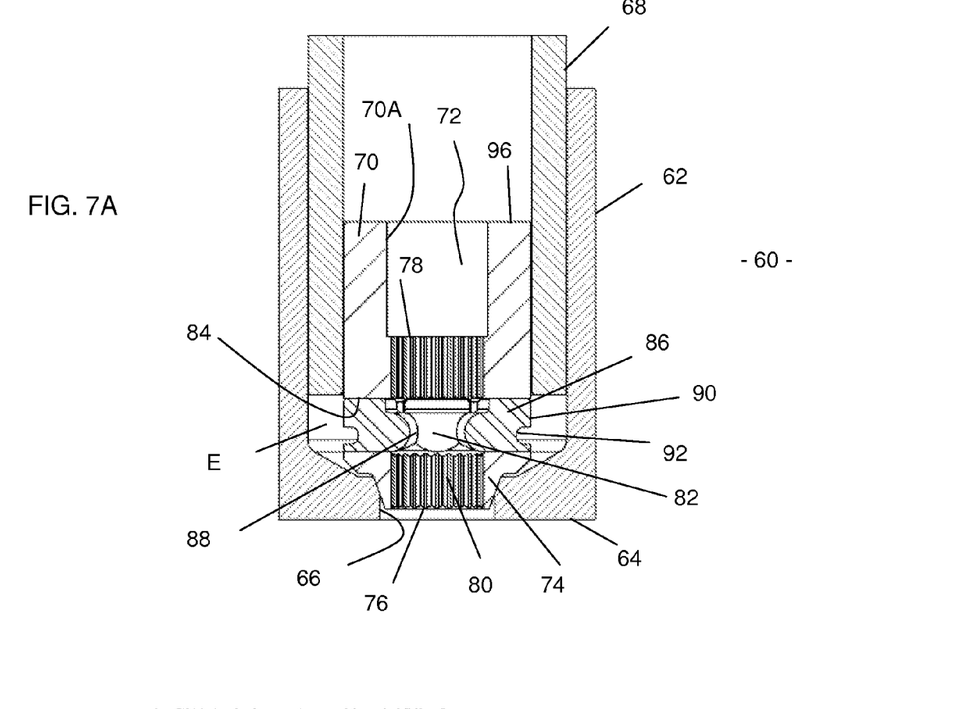
FIG. 7A is a cross-section view of a setting nose for a rivet according to a first embodiment of the invention.

FIG. 7A is a cross-section view of the setting nose 60 which may be used on a setting tool and is suitable for installing a rivet 10, 10A or 10B described above. The setting nose 60 comprises a hollow cylindrical body 62 with a front face 64 intended to come into contact with the accessible side of a structure. The front face 64 is pierced in its center with an opening 66 of sufficient diameter to allow passage of the handling element 16 and the head 20 of the screw 12. The cylindrical body 62 receives in its interior a hollow, cylindrical, fixed sheath 68. The sheath 68 is arranged in the body 62 so as to provide an inner annular space E at the front end of the body 62 close to the front face 64.

A mouth piece 70 is arranged inside the sheath 68 and is able to move axially and in rotation inside the sheath 68. The mouth piece 70 comprises an inner wall 70A delimiting a passage 72 which extends axially over the entire length of the mouth piece. The mouth piece 70 comprises a front end 74, the outer frustoconical surface of which is housed in the opening 66 of the body. The inner surface of the front end 74, forming a front end of the passage 72, comprises a first receiver portion 76 with drive surfaces 80 complementary to the splines 36 of the handling portions 28, 32 of the screw. The mouth piece 70 comprises a second receiver portion 78 in the passage 72, arranged axially at a distance from the first portion 76. The second receiver portion 78 also comprises drive surfaces 80 complementary to the splines 36 of the first handling portion 28 of the screw. In this example, the drive surfaces 80 consist of twenty-four axial splines made on the inner surface of the wall 70A of the mouth piece. The splines are continuous from the front end of the mouth piece 70 to the opposite rear end. They are distributed regularly over the inner surface of the wall 70A and correspond to the arrangement and number of splines 36 of the handling element of the screw. The radial dimensions of the splines of the setting nose correspond to the radial dimensions of the splines of the screw, within a slight clearance allowing translation movements in the axial direction between the screw and the mouth piece.

The two receiver portions 76, 78 are separated by a median portion 82 in which four housings 84 are produced radially through the full width of the wall of the mouth piece 70, opening into the passage 72. An element 86, movable in the radial direction, is arranged in each housing 84. The movable elements 86 are typically made of high hardness steel. They comprise an inner surface 88 of toric form complementary to the blocking portion 30 of the handling element 16 of the screw, and an outer cylindrical face 90 able to slide in the sheath 68. An elastic means (not shown) is arranged in annular fashion in a groove 92 made on the outer face of the movable elements and the outer face of the mouth piece. The elastic element tends to compress the movable elements radially towards inside of the mouth piece 70 in the inner passage 72. The movable elements allow variation of the inner diameter of the median portion 82 depending on the radial position they adopt. In the rest, or zero spacing, position the movable elements 86 open into the passage 72. The inner diameter of the median portion 82 is then less than the smallest diameter of the receiver portions 76, 78. This inner diameter corresponds to the outer diameter of the cylindrical part of the blocking portion 30 of the screw 16. In the maximum spacing position, the movable elements are pressed inside the housings 84 towards the outside of the mouth piece 70, such that the inner diameter of the medium portion is at least equal to the largest diameter of the receiver portions 76, 78.

The inner wall 70A between the second receiver portion 78 and its rear end 96 is smooth and has a diameter at least equal to the largest diameter of the receiver portions 76, 78 so as to allow removal of the handling element 16 once broken.

In general, over the first receiver portion 76, the setting nose comprises a surface with a form suitable for receiving the handling portions 28, 32 of the screw 12, since these two portions slide inside the first portion 76 of the setting tool. Over the second receiver portion 78, the setting nose 60 comprises a surface with a form complementary to the first portion 28 of the handling element 16 of the screw which is housed fully in this receiver portion.

Figure 7B:
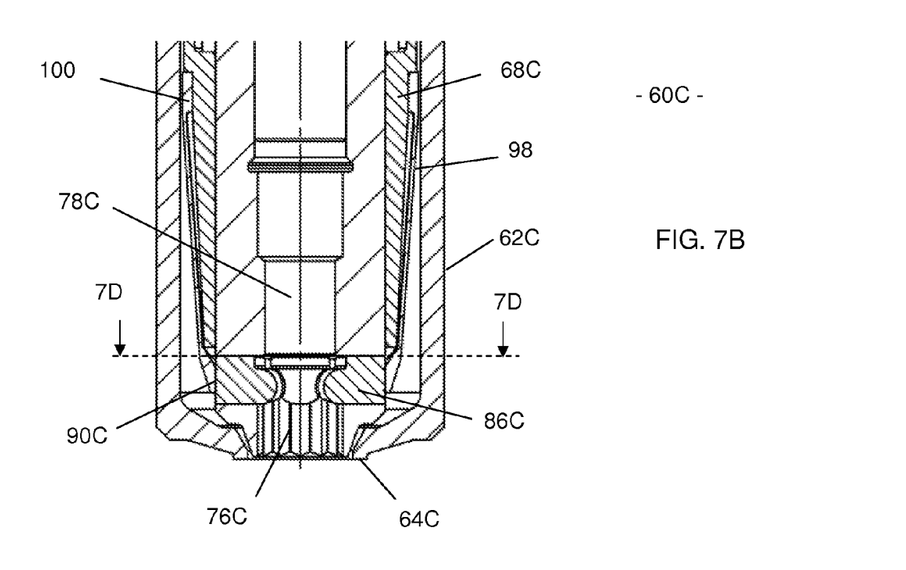
FIG. 7B is a cross-section view of a setting nose according to a second embodiment.

FIG. 7B shows a setting nose 60C suitable for installing a rivet 100, comprising a body 62C, a frustoconical sheath 68C and a cylindrical mouth piece 70C. The nose 60C comprises a first receiver portion 76C with twelve splines equivalent to the twelve splines of the second handling portion 34C of the rivet 100. The nose also comprises a second receiver portion 78C with a smooth cylindrical inner surface, with inner diameter identical—within a given clearance—to the outer diameter of the first handling portion 28C of the rivet 10C. In this example, the movable elements 86C have a cylindrical outer surface 90C without groove, and are held in place by an elastic means 98 extending between the outer surface of the sheath 68C and the inner surface of the body 62C.

Figure 7C:
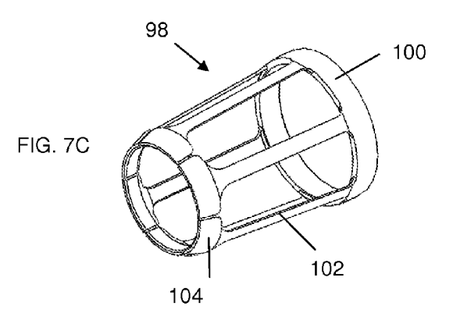
FIG. 7C is an isometric view of a perimetric spring used in the setting nose of FIG. 7B.
Figure 7D:
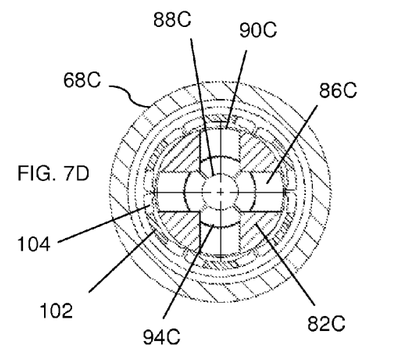
FIG. 7D is a section along axis 7D-7D of FIG. 7B, FIGS. 8 to 15 are cross-section views of a rivet in FIGS. 1 to 3, and of the setting tool in FIG. 7A, illustrating the different steps of setting the rivet.
Figure 8:
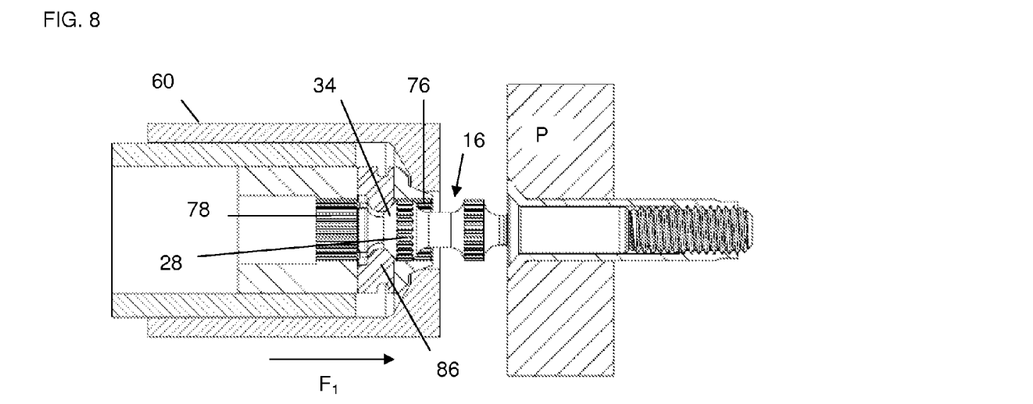

FIG. 7C is an isometric view of the perimetric spring 98 visible on FIG. 7B. The spring 98 comprises a circular end 100, the inner diameter of which sits without clearance on the outer surface of the sheath 68C. Six flexible arms 102, regularly distributed, extend from the end 100. Each flexible arm, at an end opposite the circular end, terminates in an end portion 104 in an arc covering an angular surface of 60°. In the rest position, the assembly of six end portions 104 forms a circular end of inner diameter smaller than the outer diameter of the median portion 82C. In this example, the spring 98 is mounted on the sheath 68C such that each arcuate portion 104 has a part resting on the median part 82C and on a moveable element 86C (FIG. 7D). Thus when a movable element 86C moves radially towards the outside, only a part of each end portion 104 is subjected to a radial force. Such a spring 98 is made of heat treated and hardened steel, is significantly stronger than an elastic part of rubber and will perform a large number of installation cycles without requiring maintenance. This spring does not become oval, in contrast to a spring with one or more windings, and can exert a compressive force on the movable elements 86 in a very restricted annular space.

The method of installing a rivet 10 described in relation to FIGS. 1 to 3 in a structure S is illustrated in FIGS. 8 to 15. For reasons of simplification, only a single structure S is depicted but it is understood that this structure is composed of several structural sub-elements to be assembled.

Also the installation method described below is precisely the same for installing a rivet 10A, 10B or 100 described above.

In uninstalled state, the rivet 10 is for example arranged in a container P and is gripped by a robot provided with a setting nose 60 described above. As illustrated on FIG. 8, the setting nose 60 is advanced in the direction of the handling element 16 of the screw (arrow $F_1$) until it comes into contact therewith. Guided by the chamfer 34 of the handling element, the splines 36 of the first handling portion 28 penetrate axially into the splines 80 of the first receiver portion 76 of the setting nose 60. The chamfer 34 pushes the movable elements 86 radially towards the outside as the setting nose approaches the container and the handling element 16 of the rivet advances in the mouth piece 70.

Figure 9:
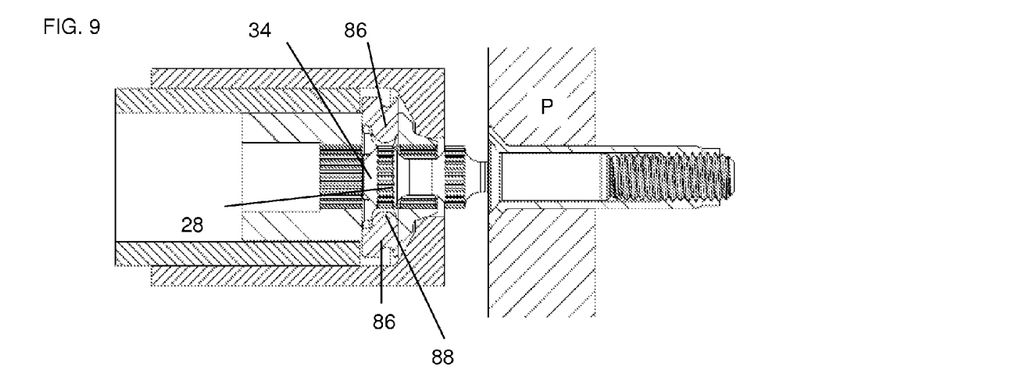

The spacing between the movable elements is at a maximum when the first handling portion 28 is arranged between the two receiver portions 76, 78 of the setting nose as illustrated on FIG. 9.

Figure 10:
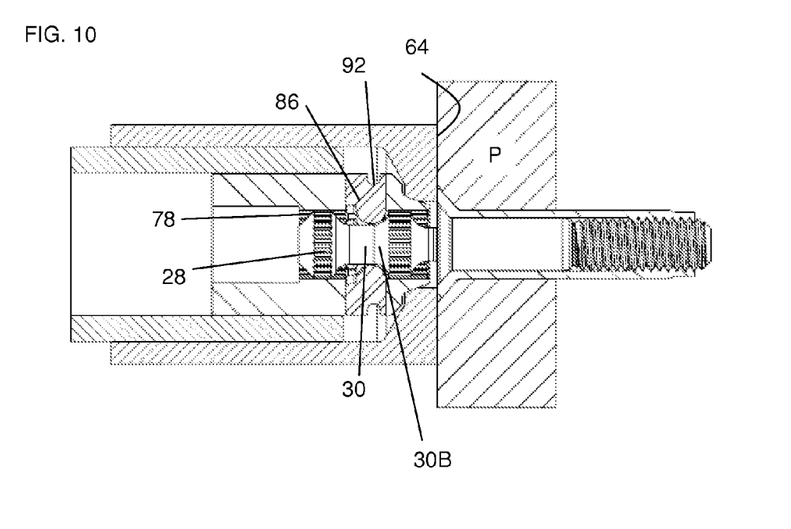
Figure 11:
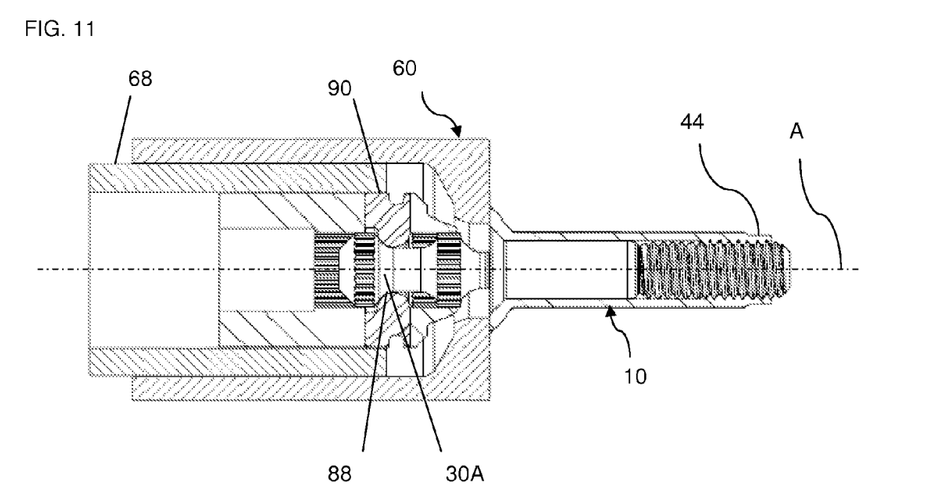

When the first handling portion 28 enters into the second receiver portion 78 of the tool (FIG. 10), the movable elements return radially towards the inside to come into contact with the blocking portion 30 of the rivet 10 under the effect of the elastic ring housed in the groove 92. The handling element 16 of the screw is then fully contained in the setting nose 60. In this position, the first handling portion 28 is inserted in the second receiver portion 78 of the setting nose, the blocking portion 30 is held by the inner surfaces 88 of the movable elements, and the second handling portion 32 is inserted in the first receiver portion 76 of the setting nose. The mouth piece 70 is then pushed back such that the movable elements come to rest against the radiused portion 30A. Since the sheath 68 is immobile inside the body 62, the cylindrical outer surface 90 of the movable elements gradually slides into the sheath 68. The movable elements 86 can then no longer move in the radial direction (FIGS. 10 and 11). Under traction, the stroke of the movable elements is limited by the radiused portion 30A of the blocking portion.

The handling element 16 of the screw is blocked in rotation in the mouth piece because of the engagement of the complementary surfaces of the handling element of the screw and the receiver portions able to transmit a torque, and also blocked in translation because of the engagement of the movable elements and the blocking portion of the screw.

The centering associated with the blocking of the rivet motion in the setting tool ensures support with a minimum angular clearance at the end 44 of the rivet, such that the rivet axis is substantially coaxial with the axis of the setting nose. As shown on FIG. 11, the axis of rivet 10 and the axis of the mouth piece 70 coincide or substantially coincide, with an angular clearance of less than a few degrees. The robot can then move to face a bore made in the structure S and align itself, for example by optical recognition. Thus the rivet 10 is substantially aligned with the axis of the bore.

The rivet 10 is then placed by the robot through the bore from the accessible side, the reduced diameter 44 at the fastener end (or the chamfer 44C for the rivet 10C) helping to center and guide the rivet in the bore. The bore here comprises a countersinking able to receive the head of the rivet, comprising the collar of the sleeve 40 and the head 20 of the screw. When the rivet head is in contact with the countersinking, the threaded end 26 protrudes from the structure on the blind side. In the position shown in FIG. 12, the handling element 16 of the screw is fully contained within the handling nose 60, and the front face 64 rests against the collar 40 of the sleeve and the accessible face of the structure S.

The first step of installation of the rivet 10 consists of forming a bulb. For this, the mouth piece 70 performs an axial movement in the direction opposite the structure—in the direction of arrow $F_2$—inside the body 62. During this movement, the outer surface 90 of the movable elements 86 slides in the sheath 68 until the movable elements are fully captive in the mouth piece 70. Thus the blocking groove 30 of the screw is firmly held by the movable elements 86 which limit the axial motion of the rivet. On FIG. 12, the mouth piece 70 pulls on the handling element 16 of screw 12, the collar 40 of the sleeve 14 being immovably held in structure by the front face 64.

Figure 13:
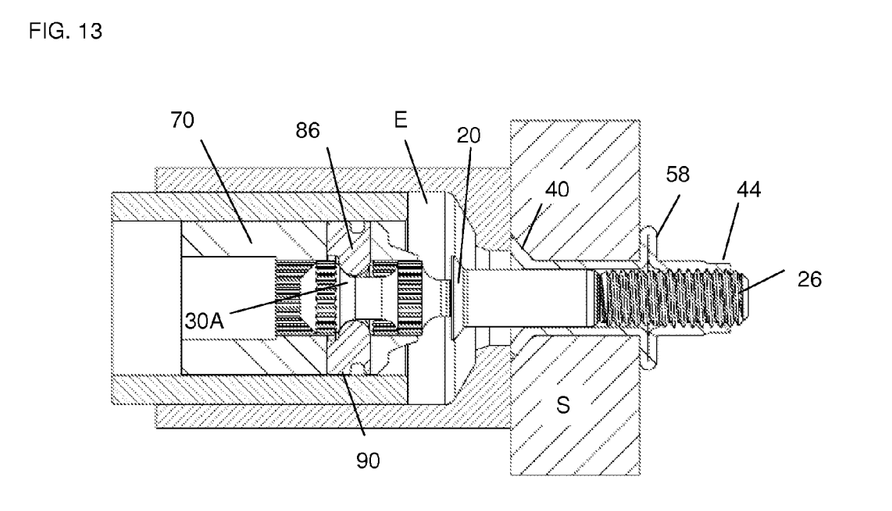

The mouth piece 70 continues to move axially, driving the threaded portion 26 of the screw and the internal thread 48 of the sleeve towards the blind side of the structure S until a bulb 58 is formed, one face of which comes to rest against the blind face (FIG. 13). The head 20 of the screw 12 is then contained in the annular space E of the setting nose.

Figure 14:
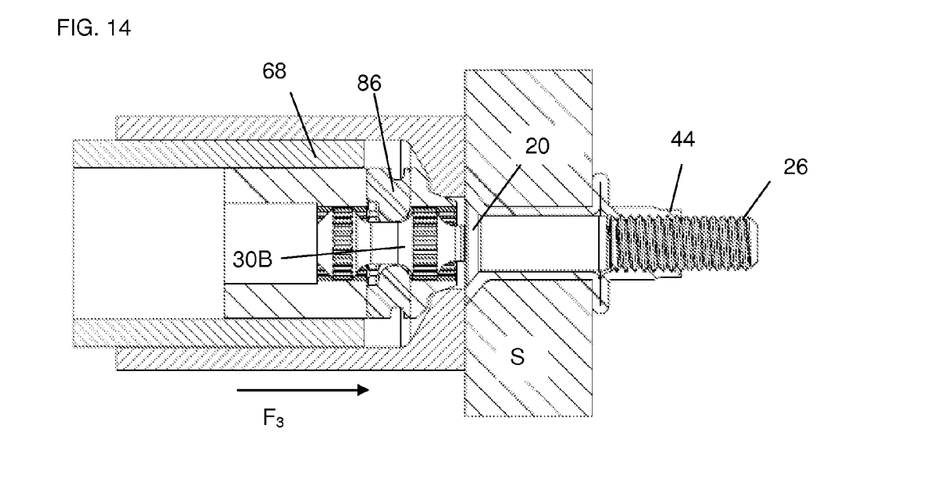

The second step consists of screwing the screw 12 into the sleeve 14 to bring the head 20 of the screw into the collar 40 of the sleeve. The traction applied to the mouth piece 70 is stopped, and a rotational movement is applied to the mouth piece which is now free to move in translation in the direction of the structure (arrow $F_3$ on FIG. 14). FIG. 14 illustrates the end of this movement: the mouth piece 70 has returned to its initial place in the sheath 68 such that the movable elements 86 are again free to move radially within the stress limits of the elastic means. The movable elements have stopped against the second radiused portion 30B of the blocking zone. The head 20 of the screw rests in the collar 40 of the sleeve. The threaded portion 26 of the screw largely protrudes from the thinner portion 44 of the sleeve 14.

The third step consists of finalising the installation of the rivet by breaking the handling element 16 of the screw. Once the head 20 of the screw rests in the collar 40 of the sleeve, the mouth piece 70 continues to turn. The torque is transmitted to the screw through the two handling portions 30, 32 of the screw. The breaking groove 18 is designed to break above a certain torque level. It breaks once this threshold is reached, leaving the head 20 flush with the accessible surface of the structure S.

Figure 15:
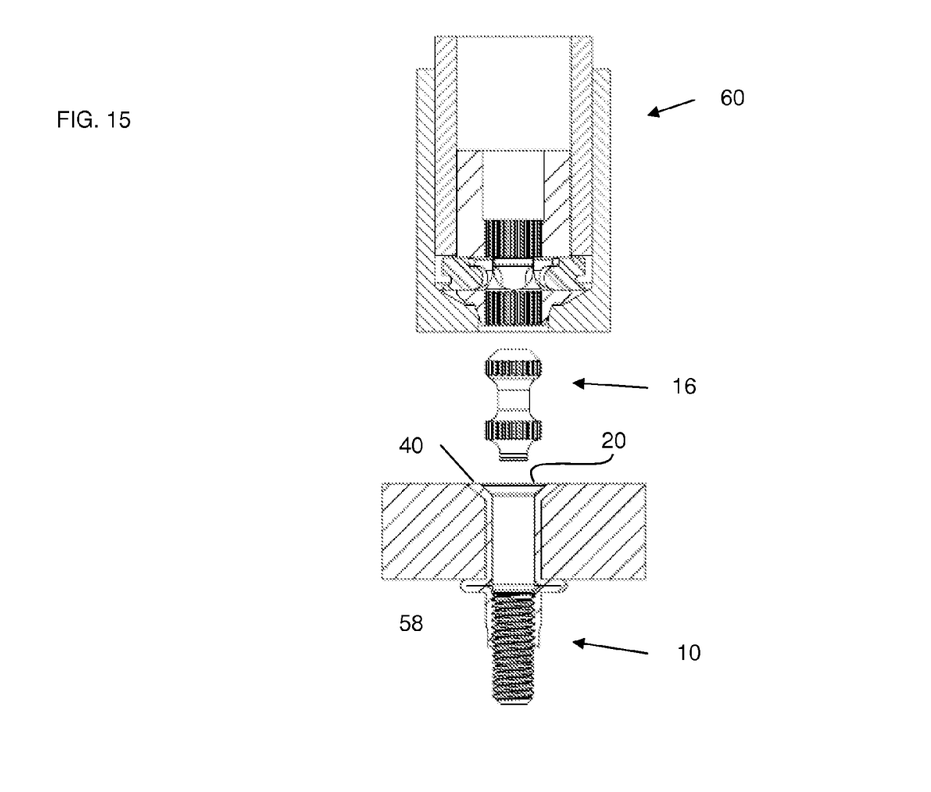

The handling element 16, once broken, is evacuated via the back or the front of the setting nose. FIG. 15 shows in exploded view the setting nose 60, the broken handling element 16 and the rivet 10 installed in the structure S.

The setting nose 60 is then withdrawn to move to the next rivet to be gripped. The installation sequence may start again.

The rivet and the setting nose according to the invention are not structurally limited solely to the examples described above. For example, the rivet head may protrude instead of being countersunk. The handling portion or portions 30, 32 able to transmit torque may comprise twelve splines, polygonal faces or any other means allowing transfer of a torque. It may also be of circular section. In this case the setting nose comprises, in the complementary receiver portion, a circular means for torque transmission such as a roller cage.

The rivet may combine several embodiments described above. For example, the sleeve 14 may comprise two welded sleeve elements 14A', 14A", and compression grooves 146, 148 on the outer surface of the first element 14A'. As a variant, the sleeve 14 may comprise a single sleeve element and an annular groove on its outer surface.

The blocking portion 30 may take different forms as long as they allow blocking of the rivet movement in the setting tool. For example the blocking portion may be cylindrical, of the same outer diameter as the adjacent handling portions, and comprise a continuous circular or oblong opening able to receive a movable element of the setting tool sliding radially.

The housings 84 and the movable elements 86 may vary in number and in form, complementary to the form of the blocking portion 30 of the rivet. The housings must allow the radial motion of the movable elements 86 around the handling element 16 of the screw on its insertion in the setting nose 60. There may be only a single housing in which a single movable element is housed, for example in the form of a fork with two branches able to support a blocking portion of reduced outer diameter of rivets 10, 10A, 10B or 10C described, or in the form of a pin sliding radially through an opening. The movable elements 86 may also be replaced by balls or elements of conical form.

The inner sheath 68 may be replaced by an annular shoulder made on the inner surface of the body 62, arranged over a sufficient length to block the movable elements 86 in the radial direction on traction of the screw to form the bulb.

The invention claimed is:

1. Rivet comprising a screw with a handling element, a breaking groove designed to hold under a tensile stress and break under a torsional stress, a head separated from the handling element by the breaking groove, a smooth shank and a threaded portion; a sleeve comprising a collar able to receive the head, and a tubular shank comprising an internal thread intended to come into engagement with the threaded portion of the screw, characterized in that the handling element of the screw comprises a first handling portion having a smooth outer circular cylindrical surface able to guide the introduction of the rivet into a setting tool, and a second handling portion able to transmit a torque, the two handling portions being separated by a blocking portion able to limit an axial motion of the rivet in a setting tool.

2. Rivet according to claim 1, wherein the blocking portion comprises a cylindrical median portion and is connected to each handling portion by a radiused portion.

3. Rivet according to claim 1, wherein the sleeve comprises two welded elements.

4. Rivet according to claim 1, wherein the sleeve comprises a zone for bulb formation with an elastic strength less than an elastic strength of the rest of the sleeve.

5. Rivet according to claim 1, wherein the sleeve comprises at least one compression groove made on an outer portion of the tubular shank of the sleeve between the collar and the zone for formation of the bulb.

6. Rivet according to claim 1, wherein the torque is transmitted by means of splines with polygonal faces or a cylindrical face.

7. Rivet according to claim 1, wherein the first handling portion comprises a chamfer.

8. Rivet according to claim 1, wherein the sleeve comprises an end portion opposite the collar, with an outer diameter smaller than the outer diameter of the shank.

9. A rivet and setting nose combination for installing the rivet, the combination comprising the rivet according to claim 1, and wherein the setting nose includes a cylindrical body with a pierced front face, a tubular sheath arranged inside the body, a mouth piece arranged inside the sheath and defining an inner passage, characterized in that the mouth piece comprises two receiver portions for the handling element of the rivet, with a form complementary to said rivet handling portions, at least one of the receiver portions being able to transmit a torque, said receiver portions being axially separated by a median portion comprising at least one element movable radially in the inner passage and able to limit an axial motion of the rivet.

10. The rivet and setting nose according to claim 9, wherein the torque is transmitted by means of splines, by means of polygonal faces or by a roller cage.

11. The rivet and setting nose according to claim 9, wherein the median portion comprises at least one housing in which the radially movable element is housed.

12. The rivet and setting nose according to claim 9, wherein an elastic means radially compresses the movable element towards the inside of the mouth piece.

13. The rivet and setting nose according to claim 9, wherein the mouth piece is movable axially and in rotation inside the sheath.

14. Method for installation of a rivet according to claim 1, using a setting nose with the rivet, wherein the setting nose includes a cylindrical body with a pierced front face, a tubular sheath arranged inside the body, a mouth piece arranged inside the sheath and defining an inner passage, wherein the mouth piece includes two receiver portions for the handling element of the rivet, with a form complementary to said handling portions, at least one of the receiver portions being able to transmit a torque, said receiver portions being axially separated by a median portion having at least one element movable radially in the inner passage and able to limit an axial motion of the rivet, characterized in that the method comprises the steps of:
    engagement of the setting nose with the handling element of the screw,
    axial traction on the handling element and formation of a bulb on the sleeve,
    screwing of the screw into the sleeve and breakage of the handling element of the screw at the level of the break groove,
characterized in that during the step of engagement of the setting nose with the handling element of the screw, a radially movable element limits an axial motion of the rivet in the setting nose.

15. Installation method according to claim 14, characterized in that during the steps of bulb formation, screwing of the screw and breakage of the handling element, the handling portions of the screw are contained in the receiver portions of the mouth piece, the blocking portion of the screw rests against the movable element, and the mouth piece is contained inside the sheath so as to prevent any radial movement of the movable element.

16. Rivet comprising a screw with a handling element, a breaking groove designed to hold under a tensile stress and break under a torsional stress, a head separated from the handling element by the breaking groove, a smooth shank and a threaded portion; a sleeve comprising a collar able to receive the head, and a tubular shank comprising an internal thread intended to come into engagement with the threaded portion of the screw, characterized in that the handling element of the screw comprises a first handling portion having an outer surface with splines extending longitudinally and the first handling portion configured to be able to guide the introduction of the rivet into a setting tool, and a second handling portion able to transmit a torque, the two handling portions being separated by a blocking portion able to limit an axial motion of the rivet in a setting tool.

* * * * *